(12) United States Patent
Krellner

(10) Patent No.: US 7,582,859 B2
(45) Date of Patent: Sep. 1, 2009

(54) INFRARED SENSOR CALIBRATION SYSTEM AND METHOD

(75) Inventor: Theodore J. Krellner, Emporium, PA (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 11/565,202

(22) Filed: Nov. 30, 2006

(65) Prior Publication Data

US 2008/0128603 A1    Jun. 5, 2008

(51) Int. Cl.
*G01D 18/00*    (2006.01)

(52) U.S. Cl. ............... 250/252.1; 250/332; 374/1; 374/2

(58) Field of Classification Search .......... None
See application file for complete search history.

(56) References Cited

U.S. PATENT DOCUMENTS 5,183,337 A    2/1993    Pompeo 6,987,223 B2    1/2006    Schneider
2002/0021739 A1*    2/2002    Fraden ............... 374/2
2006/0171442 A1*    8/2006    Volf et al. ............ 374/1

FOREIGN PATENT DOCUMENTS

JP    03215720 A    9/1991
JP    06213705 A    8/1994

* cited by examiner

*Primary Examiner*—David P Porta
*Assistant Examiner*—Yara B Green
(74) *Attorney, Agent, or Firm*—GE Global Patent Operation

(57) ABSTRACT

An infrared sensor calibration system including a calibration body at a known temperature a fixture for a package with at least two infrared sensors each aimed at a different location on the calibration body. Relative motion is provided between the calibration body and the fixture so each infrared sensor is immune to temperature variations across the calibration body during calibration of the infrared sensors.

15 Claims, 1 Drawing Sheet

INFRARED SENSOR CALIBRATION SYSTEM AND METHOD

FIELD OF THE INVENTION

This subject invention relates to sensors, and in one particular embodiment, infrared thermopile type temperature sensors.

BACKGROUND OF THE INVENTION

Infrared thermopile type temperature sensors are well known. See, for example, U.S. Pat. No. 6,987,223 incorporated herein by this reference.

Calibration of individual infrared sensors involves aiming the infrared sensor at a black body held at a known temperature. The output of the sensor is then adjusted, typically be adjusting the calibration constants associated with the sensor electronics, until the sensor outputs the known temperature of the black body.

Calibrating such a package with dual sensors is problematic. Since the sensors are purposely aimed in different directions and since the black "calibration" body may have temperature variations across its surface, especially when the black body is fairly large in size to accommodate the field of views of both sensors, each sensor may detect a different temperature. Since the goal is that both sensors are to be calibrated to detect the same temperature, presently available calibration techniques and systems result in erroneous calibrations.

SUMMARY OF THE INVENTION

In one aspect, the subject invention provides a new sensor calibration technique and system. Such a technique and system helps ensure each sensor of a package with a pair of sensors is correctly calibrated. The invention provides a calibration technique and system which is immune to temperature variations across the calibration body used to calibrate the sensor.

The subject invention results from the realization that a pair of temperature sensors each aimed in a different direction can be calibrated more accurately by rotating the calibration black body so then the sensors both detect the same average temperature of the calibration body and thus are rendered immune to temperature variations across the calibration body during calibration of the sensors.

The subject invention, however, in other embodiments, need not achieve all these objectives and the claims hereof should not be limited to structures or methods capable of achieving these objectives.

The subject invention features an infrared sensor calibration system. There is a calibration body at a known temperature and a fixture for a package with at least two infrared sensors each aimed at a different location on the calibration body. Relative motion between the calibration body and the fixture is provided so each infrared sensor is immune to temperature variations across the calibration body during calibration of the infrared sensors.

In one specific example, the calibration body is a cylinder including a high emissivity end surface. The calibration body may be made of aluminum. Preferably, the area of the end surface is large enough to encompass the entire field of view of both infrared sensors. In one example, relative motion is provided by a motor which rotates the cylinder. Typically, the fixture configured to aim one infrared sensor at one side of a center line of the end surface and to aim the other infrared sensor at an opposite side of the center line. Thus, the infrared sensors may be aimed at different spots on the end surface diameter each equidistant from the center line.

A sensor calibration system in accordance with this invention features a calibration body at a known temperature, a fixture for a package with at least two sensors each aimed at a different location on the calibration body, and means for providing relative motion between the calibration body and the fixture so each sensor is immune to temperature variations across the calibration body during calibration of the sensors.

One infrared sensor calibration system in accordance with this invention features a calibration body at a known temperature and having a rotating surface and a fixture for a package with at least two sensors each aimed at different locations on the rotating surface of the calibration body so each infrared sensor detects the same average temperature and is rendered immune to temperature variations across the extent of the rotating surface.

The subject invention also features a method of calibrating an infrared sensor package with at least two infrared sensors. The preferred method comprises aiming each infrared sensor at a different location on a calibration body at a known temperature, providing relative motion between the sensor package and the calibration body so each infrared sensor detects the same average temperature, and calibrating both sensors so they read the same temperature.

One method of calibrating dual sensors includes aiming each sensor at a different location on a calibration body at a know temperature, providing relative motion between the sensors and the calibration body so each sensor detects the same average temperature, and calibrating both sensors.

BRIEF DESCRIPTION OF THE SEVERAL VIEWS OF THE DRAWINGS

Other objects, features and advantages will occur to those skilled in the art from the following description of a preferred embodiment and the accompany drawings, in which.

DETAILED DESCRIPTION OF THE INVENTION

Figure 1:
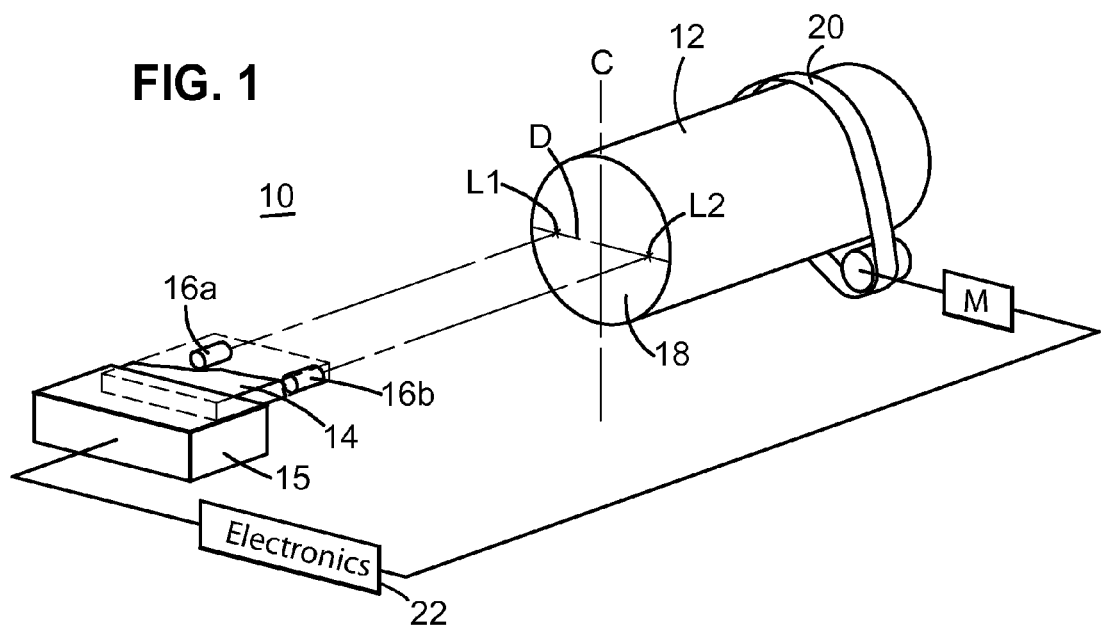
FIG. 1 is a highly schematic three-dimensional view showing the primary components associated with a sensor calibration system and method in accordance with the subject invention.
Figure 2:
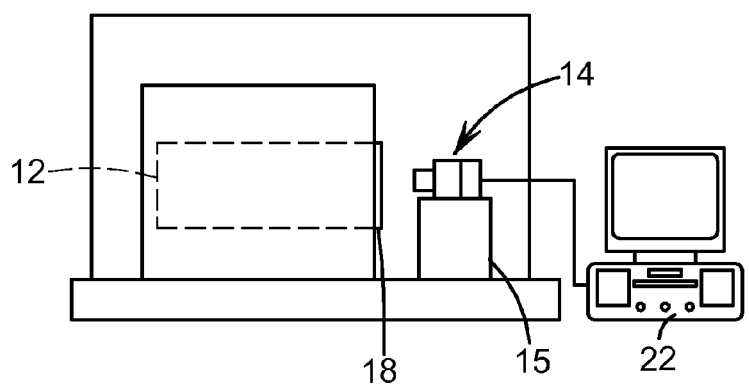
FIG. 2 is a schematic highly conceptual view of an embodiment of a test fixture in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of infrared sensor calibration sensor system 10 in accordance with the subject invention. Calibration body, typically an aluminum cylinder, is held at a known temperature. Package 14, held by fixture 15, has at least two infrared sensors 16a and 16b. Package 14 infrared sensors 16a and 16b are each aimed at different location $L_1$ and $L_2$, respectively, on high emissivity end surface 18 of black body 12. There are typically some means for rotating calibration body 12 and/or fixture 15 so each sensor 16a and 16b is rendered fairly immune to temperature variations across the extent of end surface 18. By rotating calibration body 12, for example, using motor M which drives belt 20 about cylinder 12, each infrared sensor 16a and 16b detects the same average temperature of end surface 18. First, sensor 16a is aimed at location $L_1$, then, as body 12 rotates, sensor 16b is aimed at location $L_1$, and so on.

Currently available calibration systems used to calibrate temperature sensors such as thermopiles normally use a temperature controlled black body which may have temperature variations across its surface. In general, the larger the field of view of the thermopile, the larger the black body needs to be and the greater the temperature variations across its surface. In accordance with the subject invention, an average temperature is created for each thermopile of the pair so that each thermopile detects the same, virtually identical, temperature. In this way, the calibrated difference between the thermopile readings can be minimized. Aluminum cylinder 12 is maintained at a constant temperature and end surface 18 is a high emissivity surface used as the object to calibrate the thermopile pairs 16a and 16b. The speed of rotation of cylinder 12 is selected to be adequate to minimize the average temperature variation as measured by the thermopile/signal conditioning system within electronics test bed 22. The diameter of cylinder 12, typically on the order of a foot or so, is chosen to be adequate to encompass virtually the entire field of view of thermopile pair 16a and 16b. The result is the same signal conditioned output via the calibration technique discussed above for a pair of thermopiles when either thermopile is measuring a common object temperature.

Fixture 15, typically fixed in place, can be designed to aim sensor 16a at one side of center line C of end face 18 and to aim sensor 16b at an opposite side of center line C as shown. Sensors 16a and 16b can be aimed at different spots $L_1$ and $L_2$ on end surface 18 diameter D each spot equidistant from center line C. While end surface 18 is rotating, both sensors 16a and 16b are then calibrated so they read the same temperature. Electronics test set 22 is typically responsive to test fixture 15 (itself electrically connected to device package 14) and also motor M to run a calibration routing during which calibrations body 12 is rotated, readings are taken from sensors 16a and 16b, and the calibration constants thereof are varied until each sensor reads (outputs) the same temperature.

Other types of sensors can be calibrated in this way and calibration body 12 can take a form other than a cylinder. Calibration body 12 could be a wheel or disk, for example. Also, materials other than aluminum can be used. Motion other than rotation may also be used.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words, "including", "comprising", "having", and "with" as used herein are to be interpreted broadly and comprehensively and are note limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

The invention claimed is:

1. An infrared sensor calibration system comprising:
a calibration body at a known temperature;
a fixture for a package with at least two infrared sensors each aimed at a different location on the calibration body, wherein a first infrared sensor is aimed at one side of a center line of the calibration body and a second infrared sensor is aimed at an opposite side of the center line; and
means for providing relative motion between the calibration body and the fixture so each infrared sensor is immune to temperature variations across the calibration body during calibration of the infrared sensors.

2. The system of claim 1 in which the calibration body is a cylinder including a high emissivity end surface.

3. The system of claim 2 in which the calibration body is made of aluminum.

4. The system of claim 2 in which the area of the end surface is large enough to encompass the entire field of view of both infrared sensors.

5. The system of claim 2 in which the means for providing relative motion includes a motor which rotates the cylinder.

6. The system of claim 2 in which the infrared sensors are aimed at different spots on the end surface diameter each equidistant from the center line.

7. A sensor calibration system comprising:
a calibration body at a known temperature;
a fixture for a package with at least two sensors each aimed at a different location on the calibration body, wherein a first infrared sensor is aimed at one side of center line of the calibration body and a second infrared sensor is aimed at an opposite side of the center line; and
means for providing relative motion between the calibration body and the fixture so each sensor is immune to temperature variations across the calibration body during calibration of the sensors.

8. An infrared sensor calibration system comprising:
a calibration body at a known temperature and having a rotating surface; and
a fixture for a package with at least two sensors each aimed at different locations on the rotating surface of the calibration body, wherein a first infrared sensor is aimed at one side of a center line of the calibration body and a second infrared sensor is aimed at an opposite side of the center line; so each infrared sensor detects the same average temperature and is rendered immune to temperature variations across the extent of the rotating surface.

9. A method of calibrating an infrared sensor package with at least two infrared sensors, the method comprising:
aiming each infrared sensor at a different location on a calibration body at a known temperature, wherein a first infrared sensor is aimed at one side of a center line of the calibration body and a second infrared sensor is aimed at an opposite side of the center line;

providing relative motion between the sensor package and the calibration body so each infrared sensor detects the same average temperature; and calibrating both sensors so they read the same temperature.

10. The method of claim 9 in which the calibration body is a cylinder with a high emissivity end surface.

11. The method of claim 10 in which the calibration body is made of aluminum.

12. The method of claim 10 in which the area of the end surface is large enough to encompass the entire field of view of both infrared sensors.

13. The method of claim 10 in which the sensor package remains fixed and the calibration body is rotated.

14. The method of claim 10 in which the infrared sensors are aimed at different spots on the end surface diameter each equidistant from the center line.

15. A method of calibrating dual sensors, the method comprising:

aiming each sensor at a different location on a calibration body at a known temperature, wherein a first infrared sensor is aimed at one side of a center line of the calibration body and a second infrared sensor is aimed at an opposite side of the center line;

providing relative motion between the sensors and the calibration body so each sensor detects the same average temperature; and calibrating both sensors.

* * * * *